W. Wheeler,
Cutting Curry-Comb Teeth.
N°.10,166.  Patented Oct. 25, 1853.
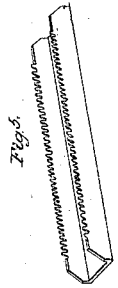
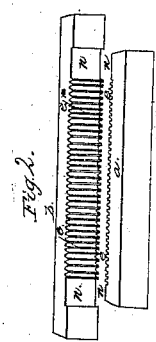 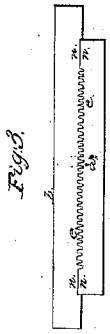 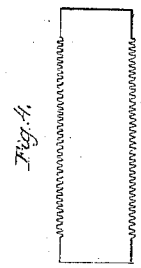
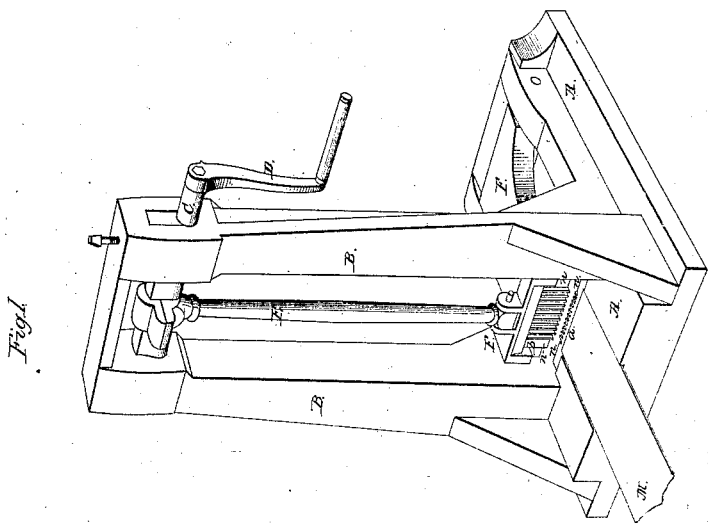

UNITED STATES PATENT OFFICE.

WILLIAM WHEELER, OF WEST POULTNEY, VERMONT, ASSIGNOR TO CHAS. H. KELLOGG.

CUTTING THE BARS AND TEETH OF CURRYCOMBS.

Specification of Letters Patent No. 10,166, dated October 25, 1853.

*To all whom it may concern:*

Be it known that I, WILLIAM WHEELER, of West Poultney, in the county of Rutland and State of Vermont, have invented a new and Improved Method of Cutting the Bars and Teeth of Currycombs, of which the following is a full, clear, and exact description, reference being had to the accompanying drawing, which forms part of this specification, and in which—

Figure 1 represents a view in perspective of a punching machine with the dies open and in the act of receiving the end of a strip of brass plate to have a toothed comb cut off it; Fig. 2 a view in perspective of the dies detached from the machine; Fig. 3 a top view of the two dies in close contact as they would appear when closed after severing a comb off the plate; Fig. 4 a plan of a toothed bar for curry combs as it leaves the dies; and Fig. 5 a perspective view of the bar bent into the form in which it is usually employed in the curry comb.

A machine by means of which my improved process of making combs may be carried into effect, is represented in the accompanying drawing. It consists of a frame, the base or bed plate (A) of which supports a fixed die (*a*) and a gallows frame (B), in the upper part of which a shaft (C) is supported in suitable bearings. This shaft in this instance receives a rotary motion from a winch (D). On the middle of this shaft an eccentric or crank is formed, which by the turning of the shaft imparts a reciprocating motion to a connecting rod (E), which motion is transmitted to the free extremity of a powerful jaw (F) which is hinged at its opposite extremity to the back of the bed plate. The front of this jaw carries a serrated die (*b*) the teeth of which are precisely the counterpart of those of the fixed die (*a*) in order that the two dies may match accurately together. The upper corners of the teeth of the fixed die (*a*) and the lower corners of the teeth of the movable die (*b*) pass in close contact like the blades of shears, whenever the movable die is properly adjusted and depressed by the descent of the jaw (F) below the upper face of the fixed die.

The two dies (*a* and *b*) are respectively secured to the bed plate (A) and to the face of the jaw (F) by a series of screws or otherwise, so that they can readily be removed to be sharpened by grinding the side of the die at right angles to the teeth, or for replacement by other dies. Each die has a series of narrow teeth (*e*) the exact counterpart of each other cut on their adjacent faces to form the teeth of the comb, and at each end of the series of teeth (*e*) there is a margin (*n*) left straight, and the whole surface of both the margin and teeth fit accurately together as seen in Fig. 3. The dies when set in the machine are so adjusted that when the moving die is at the lower extreme of its stroke the lower corners of its teeth shall pass slightly below the upper corners of the teeth of the fixed die (*a*) in order that any substance between the two held across the ends of the teeth may be divided by a shearing cut. The range of motion of the jaw is sufficient to leave an opening between the moving and the fixed dies to admit the thing to be cut off, a plate for example. An adjustable stop is placed on the underside of the jaw against which the piece being fed will strike every time it is inserted, thus insuring uniformity in width of any number of pieces thus cut off in succession. An opening through the bed plate beneath the jaw (F) permits the pieces shorn off to drop freely.

The operation of the machine is as follows:—A strip of metal (M) of the width of the serrated portion (*e*) of the dies and the margins (*n*) and of the thickness required to form the bar of a curry comb is taken and inserted endwise between the dies, as represented in Fig. 1, until the inner end of the plate is stopped by the gage. The jaw now descends and severs the piece beneath it from the plate to form the bar, cutting a row of teeth both on the end of the plate and on the piece or bar cut therefrom to form the comb. The jaw now rises, when the plate must be again pushed in, by an attendant, until it strikes the gage, and is held there until the jaw again descends and repeats the operation of cutting. A dexterous attendant will feed the plate, while the jaw is vibrating with great rapidity, and each stroke after the first on each plate will make a comb plate or bar complete, with a double row of teeth.

I have described a very simple and convenient machine, but it is obvious that numerous other forms and arrangements of mechanism might be adapted for operating the dies without in any way departing from the principle or method of operation which I have devised and which to a great extent is independent of any special construction or arrangement of mechanism.

What I claim as my invention and desire to secure by Letters Patent, is—

The method of forming the bars of curry combs by punching them out of plates so that at a single operation a strip of the proper width for the bar is severed from the plate, and one row of teeth cut thereon, and another row upon the end of the plate for the next bar, substantially as herein set forth.

In testimony whereof, I have hereunto subscribed my name.

WILLIAM WHEELER.

Witnesses:
I. B. BEAMAN,
JOHN Q. KELLOGG.